United States Patent [19]

Lange

[11] Patent Number: 4,787,768
[45] Date of Patent: Nov. 29, 1988

[54] FASTENER APPARATUS

[75] Inventor: Fredric A. Lange, Osseo, Minn.

[73] Assignee: Interlock Structures International, Inc., Minneapolis, Minn.

[21] Appl. No.: 162,985

[22] Filed: Mar. 2, 1988

[51] Int. Cl.$^4$ .......................... B25G 3/00; F16B 9/00
[52] U.S. Cl. ................................. 403/235; 403/297; 403/255; 248/231.2
[58] Field of Search ............... 403/233, 235, 236, 191, 403/297, 255; 248/231, 231.2; 52/582; 160/135

[56] References Cited

U.S. PATENT DOCUMENTS

| 1,787,017 | 12/1930 | Paul. | |
|---|---|---|---|
| 2,732,158 | 1/1956 | Haverlee. | |
| 2,744,706 | 5/1956 | Gerdy. | |
| 2,898,619 | 8/1959 | Beck | 403/235 X |
| 3,526,381 | 9/1970 | Pepe. | |
| 3,894,707 | 7/1975 | Heard. | |
| 3,972,639 | 8/1976 | Lening. | |
| 4,049,230 | 9/1977 | Minniear. | |
| 4,397,448 | 8/1983 | Dillon | 403/233 X |
| 4,429,440 | 2/1984 | Laughlin et al.. | |
| 4,485,597 | 12/1984 | Worrallo | 403/255 X |
| 4,636,104 | 1/1987 | Dinh. | |
| 4,653,652 | 3/1987 | Avati. | |
| 4,718,789 | 1/1988 | Kuenen | 403/233 |
| 4,725,030 | 2/1988 | Miller et al. | 248/231.2 |

Primary Examiner—Andrew V. Kundrat
Attorney, Agent, or Firm—Merchant, Gould, Smith, Edell, Welter & Schmidt

[57] ABSTRACT

A slat-wall is fastened at an edge to an elongated member. A metallic strap is formed to have first and second end portions and a central portion therebetween. The central portion fits about the elongated member so that the first and second end portions extend into a groove in the slat-wall. A screw is tightened to separate the first and second end portions against opposite sides of the groove.

7 Claims, 1 Drawing Sheet

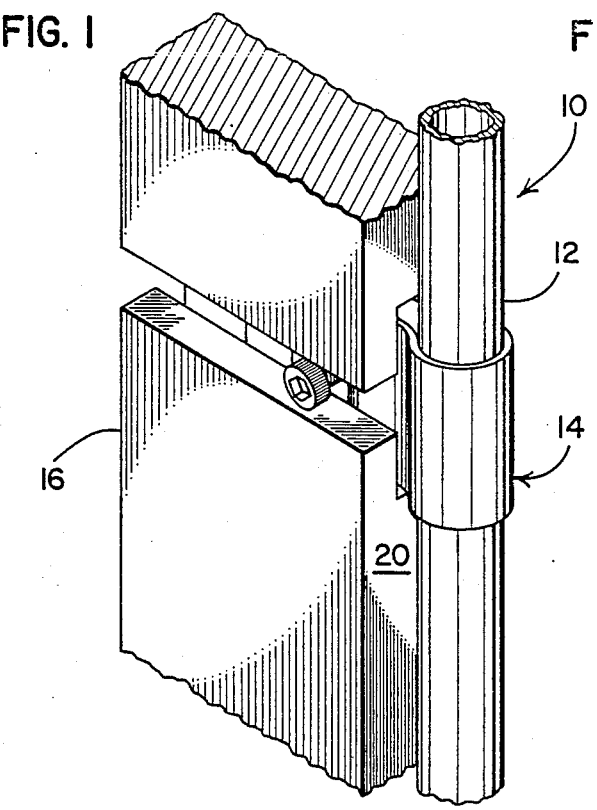
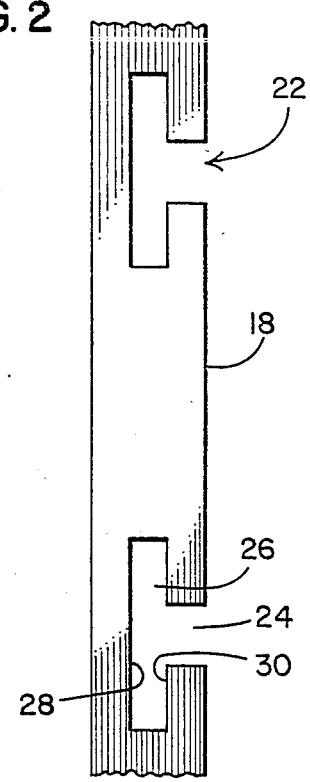
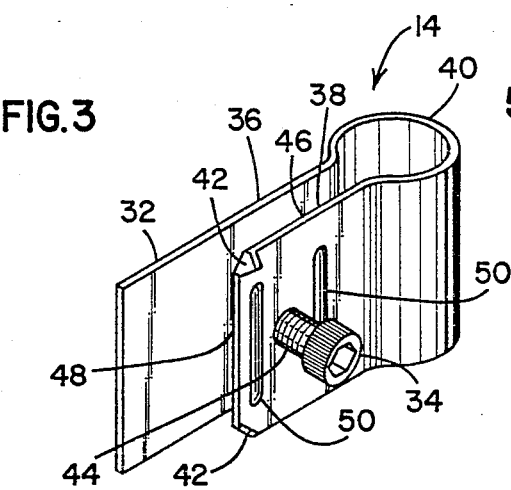
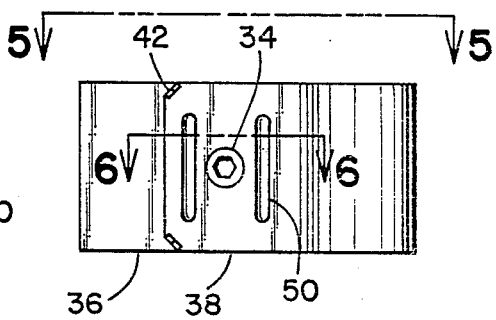
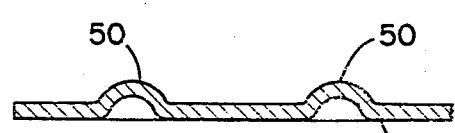
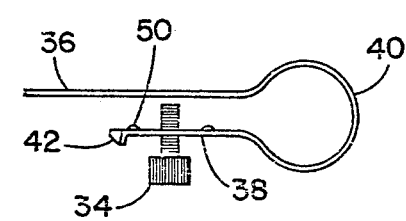

FASTENER APPARATUS

FIELD OF THE INVENTION

The present invention is directed generally to fasteners and, more particularly, to apparatus for connecting an elongated member to the edge of a wall having a slot which extends into the wall.

BACKGROUND OF THE INVENTION

Structures are ordinarily framed using elongated members. An exemplary structure is a free standing exhibit in a convention hall. Commonly, such structures use trusses to outline a particular space. Often, walls extend between frame members so that various advertising or other material may be displayed thereon.

"Slat-wall" is known. Slat-wall is a wall having thickness which includes a plurality of parallel extending T-shaped slots formed in the face of the wall. The slots are useful for attaching various items. Slat-wall is particularly applicable for use in exhibit spaces. The problem is that there is no known simple fastener for attaching slat wall to an elongated member, such a simple cylindrical tube.

SUMMARY OF THE INVENTION

The present invention is directed to fastener apparatus which includes a longitudinal member, a slatwall, and mechanism for holding an edge of the wall adjacent to the elongated member. The slat-wall includes a T-shape groove with a base slot and a cross slot. The groove opens along the edge of the wall. The base slot opens along the face of the wall and communicates with the cross slot. The cross-slot has an unbroken inner side and a broken inner side, the latter of which receives the base slot. The holding mechanism includes mechanism for fitting from the groove around the elongated member. The fitting mechanism includes a portion extending into the groove. The holding mechanism further includes mechanism extending through the base slot for retaining the portion of the fitting mechanism in the groove.

More particularly, the fastener apparatus includes a metallic strap forming first and second end portions with a central portion between the end portions. The central portion is formed to fit about the elongated member so that the first and second end portions extend away from the elongated member and into the end of the groove. The end portion adjacent to the broken inner side of the cross slot includes a threaded opening. A screw extends through the base slot in the wall to be received in the threaded opening so that when it is tightened, one end portion of the strap is pressed against the unbroken inner side, while the other end portion is pressed against the broken inner side. In this way, the strap removeably fastens the wall to the elongated member.

Advantageously, the fastener is not only particularly simple, but is particularly effective for fastening "slat-wall" to an elongated member, such a cylindrical tube. The connecting element is a single piece of material particularly shaped and used with a screw.

BRIEF DESCRIPTION OF THE DRAWINGS

FIG. 1 is a perspective view of fastening apparatus in accordance with the present invention;

FIG. 2 is a side view of slat-wall;

FIG. 3 is a perspective view of a strap fastener in accordance with the present invention;

FIG. 4 is a plan view of the fastener of FIG. 3;

FIG. 5 is a side view of the fastener of FIG. 4; and

FIG. 6 is a cross-sectional view taken along line 6—6 of FIG. 4.

DETAILED DESCRIPTION OF THE PREFERRED EMBODIMENT

Referring now to the drawings wherein like reference numerals designate identical or corresponding parts throughout the several views, and more particularly to FIG. 1, fastening apparatus in accordance with the present invention is designated generally by the numeral 10. Apparatus 10 includes an elongated member in the form of a cylindrical tube 12 fastened with a fastening device 14 to a slat-wall 16.

As shown in FIG. 2, slat-wall 16 has a face 18 with an edge 20 wherein T-shaped grooves 22 open. Each groove 22 includes a base slot 24 which opens to face 18 and a cross slot 26 which is in communication with base slot 24. Cross slot 26 has an unbroken inner side 28 spaced from a broken inner side 30. Broken inner side 30 is separated by base slot 24.

As shown in FIG. 3, fastener 14 is formed from a metallic strap 32 and includes a screw 34. Strap 32 has first and second end portions 36 and 38 and a central portion 40 therebetween. Central portion 40 is formed to have a cylindrical shape to fit snugly about tube 12. First and second end portions 36 and 38 extend from central portion 40 in order to fit into the end of cross slot 26. First end portion 36 is longer than second end portion 38 so that as the end portions are separated to allow tube 12 to pass between them, first end portion 36 can fit into cross slot 26 to help position device 14 so that second end portion 38 is more readily received in the end of cross slot 26.

Second end portion 38 includes corners 42 which are bent to be directed toward broken inner side 30 when second side portion 38 is fitted in cross slot 26. Corners 42 penetrate side 30 to retain device 14 from slipping with respect to slat-wall 16. Second end portion 38 further includes a threaded opening 44 approximately centered between side edges 46 and spaced from end edge 48. Screw 34 is threaded into opening 44 in order to separate the first and second end portions and press the first end portion 36 against unbroken inner side 28 and second end portion 38 against broken inner side 30. A pair of channels 50 are formed on each side of threaded opening 44 to run approximately parallel with tube 12 when device 14 is holding tube 12. Channels 50 help rigidify second end portion 38 as screw 34 is tightened to press ends 42 into broken inner side 30. Channels 50 have ends which are spaced from edges 46.

In use, first and second end portions 36 and 38 are separated so that fastening device may be moved in a transverse direction to receive tube 12, which extends longitudinally. Edge 20 of slat-wall 16 is then moved transversely toward tube 12 so that first end portion 36 is received in the end of cross slot 26 and then second portion 38 is received in cross slot 26. Screw 34 should be pre-threaded a short distance in threaded opening 44. With tube 12 and edge 20 in close proximity, screw 34 is tightened. The end of screw 34 presses first end portion 36 against unbroken inner side 28 of cross slot 26. Second end portion 38 is pressed against broken inner side 30 until corners 42 penetrate side 30.

Slat-wall 16 may be unfastened from tube 12 by reversing the indicated procedure. Briefly, screw 34 is loosened and tapped so that corners 42 are pushed away from broken inner side 30. First and second end portions 36 and 38 are then easily slid from the end of cross slot 26 and slat-wall 16 is moved away from tube 12.

Fastening apparatus 10 provides a fastening mechanism for attaching a slat-wall to an elongated member. Furthermore, device 14 need not be slid from an end of the elongated member, even though device 14 fits around the member. Device 14 is installed simply by turning a screw. Furthermore, the apparatus may be taken apart simply by loosening the screw and freeing the corners 42. Device 14 provides a desired connection between an elongated member and a slat-wall. Furthermore, device 14 is aesthetically pleasing in that central portion 40 conforms to the shape of the elongated member. End portions 36 and 38 fit within the slat-wall. Screw 34 is unobtrusive and is located behind the face of slat-wall 16.

In this way, the preferred embodiment and the advantages thereof have been set forth in detail. It is understood, however, that equivalents may function as well. Consequently, it is noted that changes made, especially in matters of shape, size, and arrangement, to the full extent extended by the general meaning of the terms in which the appended claims are expressed, are within the principle of the present invention.

What is claimed is:

1. Fastener apparatus, comprising:
   an elongated member;
   a wall with a face and an edge, said wall having a T-shaped groove with a base slot and a cross slot, said groove having an end opening along said edge, said base slot opening along said face and communicating with said cross slot, said cross slot having an unbroken inner side and a broken inner side intersecting with said base slot; and
   means for holding the edge of said wall adjacent to said elongated member, said holding means including means for fitting from said groove around said elongated member, said fitting means including a portion extending into the end of said cross slot, said holding means further including means extending through said base slot for retaining said portion of said fitting means in said cross slot.

2. Fastener apparatus, comprising:
   an elongated member;
   a wall with a face and an edge, said wall having a T-shaped groove with a base slot and a cross slot, said groove having an end opening along said edge, said base slot opening along said face and communicating with said cross slot, said cross slot having an unbroken inner side and a broken inner side intersecting with said base slot;
   a metallic strap forming first and second end portions and a central portion therebetween, said central portion fitting about said elongated member so that said first and second end portions extend away from said elongated member and fit into said end of said groove; and
   means for separating said first and second end portions so that said first end portion is pressed against said unbroken inner side and said second end portion is pressed against said broken inner side, said separating means being accessible through said base slot.

3. The apparatus in accordance with claim 2 wherein said first end portion includes a segment which extends into said cross slot beyond said second end portion.

4. The apparatus in accordance with claim 2 wherein said separating means includes a threaded opening in said second end portion and a screw received in said threaded opening.

5. The apparatus in accordance with claim 4 wherein said second end portion includes means for penetrating said broken inner side.

6. The apparatus in accordance with claim 5 wherein said strap extends transversely with respect to said elongated member from said first and second end portions to said central portion, said second end portion also including a longitudinally-extending channel with ends spaced from strap edges to rigidify said second end portion.

7. A fastening device for attaching an edge of a wall to an elongated member, said wall having a face and a T-shaped groove therein, said groove including a base slot and a cross slot, said groove having an end opening along said edge, said base slot opening along said face and communicating with said cross slot, said cross slot having an unbroken inner side and a broken inner side receiving said base slot, said fastening device comprising:
   a metallic strap forming first and second end portions and a central portion therebetween, said central portion fitting about said elongated member so that said first and second end portions extend away from said elongated member and fit into said first end of said groove, said first end portion extending farther into said cross slot than said second end portion, said second end portion having bent corners so that said corners are directed toward said broken inner side, said second end portion also including a rigidifying channel with ends spaced from strap edges, said second end portion further including a threaded opening; and
   a screw received through said base slot and in said threaded opening for separating said first and second end portions so that said first end portion is pressed against said unbroken inner side and said second end portion is pressed against said broken inner side.

* * * * *